US006788854B2

(12) United States Patent
Steenbergen et al.

(10) Patent No.: US 6,788,854 B2
(45) Date of Patent: Sep. 7, 2004

(54) OPTICAL COUPLER AND AWG HAVING THE SAME

(75) Inventors: Cornelis Adrianus Marinus Steenbergen, Bilthoven (NL); Marijn Pieter Dessens, Utrecht (NL)

(73) Assignee: ThreeFive Photonics B.V., Da Houten (NL)

( * ) Notice: Subject to any disclaimer, the term of this patent is extended or adjusted under 35 U.S.C. 154(b) by 2 days.

(21) Appl. No.: 10/091,216

(22) Filed: Mar. 4, 2002

(65) Prior Publication Data

US 2003/0012510 A1 Jan. 16, 2003

(30) Foreign Application Priority Data

Dec. 1, 2001 (EP) .......................................... 01204779

(51) Int. Cl.[7] .................................................. G02B 6/26
(52) U.S. Cl. ............................ 385/50; 385/15; 385/43; 385/46
(58) Field of Search ............................. 385/15, 24, 27, 385/28, 31, 38, 39, 43, 46, 50

(56) References Cited

U.S. PATENT DOCUMENTS

| 5,461,684 A | 10/1995 | Vinchant et al. ............... 385/22 |
| 6,278,813 B1 * | 8/2001 | Takada et al. .................. 385/24 |

FOREIGN PATENT DOCUMENTS

| EP | 0 598 622 | 5/1994 | ............ G02B/6/28 |
| EP | 0 785 449 | 7/1997 | ............ G02B/6/28 |

OTHER PUBLICATIONS

Okuda, E., et al.; "Optical Accessor and Star Coupler Composed of Planar Gradient–Index Glass Waveguide"; International Conference on Integrated Optics and Optical Fibre Communication (IOOC) and European Conference on Optical Communication (ECOC); Oct. 1–4, 1985; pps. 423–426.

Rasmussen, T., et al.; "Design and Performance Evaluation of 1–by–64 Multimode Interference Power Splitter for Optical Communications"; Journal of Lightwave Technology; Oct. 1, 1995, pps 2069–2074, vol. 13, No. 10.

Tanaka, I., et al; "Glass Wavegide IXN Branching Devices"; IEICE Transactions on Communications, Institute of Electronics Information and Communications; Sep. 1, 1992; pps. 886–892, vol. E75–B, No. 9.

\* cited by examiner

Primary Examiner—John D. Lee
(74) Attorney, Agent, or Firm—Knoble Yoshida & Dunleavy (57) ABSTRACT

The invention pertains to an optical coupler comprising at least one input waveguide, a coupling region, and a plurality of output waveguides. The coupling region comprises a plurality of coupled waveguides, which diverge with respect to each other in the propagation direction of electromagnetic radiation launched in the said input waveguide. In these couplers, both the amplitude distribution and a phase distribution can be accurately matched the output waveguides resulting in relatively low loss and cross-talk.

23 Claims, 5 Drawing Sheets fig.1A  fig.1B fig.2A fig.2B fig.2C fig.3 fig.4 fig.5A  fig.5B fig.6 fig.7

OPTICAL COUPLER AND AWG HAVING THE SAME

FIELD OF THE INVENTION

The invention pertains to an optical coupler including at least one input waveguide, a coupling region, and a plurality of output waveguides.

BACKGROUND OF THE INVENTION

U.S. Pat. No. 5,136,671 is directed to an N×N integrated optical interconnection apparatus having two such couplers. In this case, the apparatus is so called a star coupler. In the description of U.S. Pat. No. 5,136,671, it is explained that optical switching, multiplexing, and de-multiplexing have been-accomplished in the past by using an interconnection apparatus having a plurality of closely spaced input waveguides communicating with the input of a star coupler. The output of the star coupler communicates with an optical grating having a series of optical waveguides, each of the waveguides differing in length with respect to its nearest neighbour by a predetermined fixed amount. The grating is connected to the input of a second star coupler which form the outputs of the switching, multiplexing, and de-multiplexing apparatus.

It is recognised in U.S. Pat. No. 5,136,671 that, in order to achieve high efficiency power transfer between a relatively large number of input ports and a relatively large number of output ports, the input and output waveguides connected to the star couplers must be closely spaced in the vicinity of the star couplers. This causes a significant degree of mutual coupling between those adjacent input and output waveguides, producing increased undesirable cross-talk between the channels of the device and decreased efficiency in transferring optical power from the selected input ports to selected output ports of the apparatus.

The star couplers described in U.S. Pat. No. 5,136,671 have a dielectric slab which forms a free space region having two curved, preferably circular, boundaries. The input waveguides and the waveguides in the grating are connected to the free space region in a substantially uniform fashion along the boundaries.

U.S. Pat. No. 4,786,131 is directed to an M×N (star) coupler having a planar waveguide having a pair of opposed edges that serves as entrance and exit facets "for introducing and extracting electromagnetic radiation from said waveguide."The planar waveguide is structured to confine the radiation propagating therein in a single mode in its depths without confining it in its width so that, in its width, radiation propagates as an expanding wavefront.

For the sake of completeness, it is noted that European patent application 0 717 295 discloses an M×O multiplex-/de-multiplex device including two evanescent wave couplers each having an array of fused optical fibres. The phase distribution at the output of such couplers does not describe a circular or elliptic phase front, which are therefore less suitable for use in AWGs. This is especially true for wavelength de-multiplexers designed to operate at a broad wavelength range.

According to the above prior art documents, although the phase distribution at the output plane of the star couplers can be adequately matched to the output waveguides, the amplitude distribution cannot. As a result of such amplitude mismatch, a considerable amount of the electromagnetic radiation will be coupled in the areas between the output waveguides, in turn resulting in insertion losses and additional cross-talk, especially when applied in arrayed waveguide gratings.

It is one of the objects of the present invention to provide an improved optical coupler, wherein the amplitude distribution substantially matches the output waveguides.

SUMMARY OF THE INVENTION

To accomplish the above and other objects, the coupler according to the first aspect is characterised in that the coupling region comprises a plurality of coupled waveguides which, over at least part of their lengths, diverge with respect to each other in the propagation direction of electromagnetic radiation launched in the input waveguide.

It is preferred that the width of at least some of the waveguides in the coupling region also increases, preferably gradually, and/or that the width of the gaps between the waveguides in the coupling region is at least substantially constant.

As will be explained below, coupling between the waveguides is enhanced considerably if at least some of the waveguides in the coupling region includes a section having a width that is less than the critical width of the waveguide at the wavelength(s) at which the coupler is designed to operate.

In a further preferred embodiment, the centre lines of at least some of the gaps between the waveguides in the coupling region follow the lines of a Gaussian diffraction pattern in accordance with the following set of equations (E1) or a linearised version thereof:

$$w(z) = w_k \sqrt{1 + (\alpha z)^2} \; ; \; \alpha = \frac{(\lambda/n_{\mathit{eff}})}{\pi w_o^2} ; \; R = z\left(1 + \left(\frac{1}{\alpha z}\right)^2\right) \qquad \text{E1}$$

where z is the longitudinal propagation position; w(z) is the z-dependent lateral position of the central line of the $k^{th}$ gap; $w_k$ is the position of the centre of the $k^{th}$ gap at z=0; $w_0$ is the beam waist at z=0; λ is the wavelength in vacuum, $N_{\mathit{eff}}$ is the effective index and R is the radius of curvature of the phase front.

In a coupler designed using the above equations E1, the sum of the widths of the waveguides and gaps gradually, increases in the propagation direction, and insertion loss and cross-talk are further reduced.

The amplitude distribution and, hence the distribution of power, over the output waveguides is further modified by adjusting the positions in the propagation direction, where centre lines of the gaps between the waveguides in the coupling region start to follow the lines of a diffraction pattern. For example, the power distribution is equalised so as to obtain a very effective power coupler. The above modification is preferably done by means of the following set of equations (E2) or a linearised version thereof:

$$w(z) = \begin{cases} w_k, & \text{for } z < z_k \\ w_k \sqrt{1 + [\alpha(z - z_k)]^2}, & \text{for } z >= z_k \end{cases} ; \; \alpha = \frac{(\lambda/n_{\mathit{eff}})}{\pi w_o^2} \qquad \text{E2}$$

Since the gaps are parallel to the flow direction of the light, there is no reflection of the light to the side wall (read gaps here) of the waveguide. Since no reflection occurs to the side walls, there will be no interference due to the presence of multiple light paths, thereby maintaining the phase distribution of the light similar to a free diffraction region. The presence of the gaps, however, ensures that the amplitude distribution is affected though.

In a preferred embodiment, when electromagnetic radiation of a wavelength at which the coupler is designed to operate is launched in one of the inputs, the coupler generates an amplitude distribution, which exhibits, in a lateral direction, a plurality of peeks and wherein the output waveguides are positioned at the lateral positions of these peaks. Thus, the amount of radiation coupling into the gaps between the waveguides as well as cross-talk are further reduced.

In general, it is preferred that all the above-mentioned waveguides in the coupler according to the present invention are planar waveguides.

The invention also pertains to an Arrayed Waveguide Grating (AWG), also known as inter alia Phasar, Phaseur, and Waveguide Grating Router, having the present coupler. The advantages of the coupler are especially noticeable in AWGs, since even small deviations from the amplitude and phase distributions for which such a device was designed result in substantial losses or render it inoperative all together.

BRIEF DESCRIPTION OF DRAWINGS

The invention will now be explained in more detail with reference to the drawings in which several preferred embodiments are schematically shown.

DESCRIPTION OF PREFERRED EMBODIMENTS

Figure 1A:
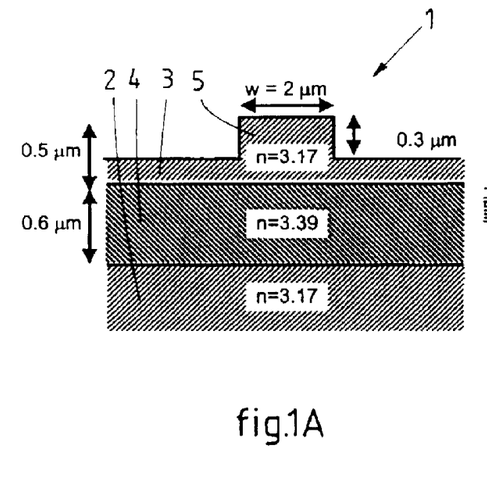
FIGS. 1A and 1B show a cross-sectional view of a typical waveguide structure respectively of a mode propagating therein.
Figure 1B:
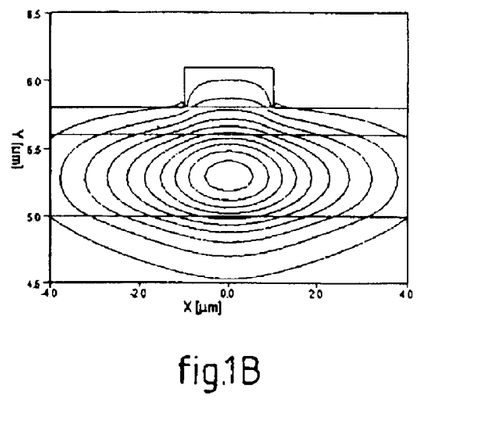

An example of a typical waveguide structure 1 as shown in FIG. 1A includes a substrate 2 and a top layer 3 of InP (having a refractive index of n=3.17) sandwiching a core layer 4 of InGaAsP (having a refractive index of n=3.39). Other types of materials such as silica on silicon ($SiO_2$/Si), siliconoxintride (SiON), silicon on insulator (SOI), and polymers are equally suitable. The top surface of the top layer 2 exhibits a ridge 5, which causes a lower energy state region in the structure and thus defines a quantum well, i.e. in this case an optical waveguide. Launching electromagnetic radiation having a wavelength of e.g. 1.5 μm in the waveguide results in a mode having a field distribution as shown in FIG. 1B.

Figure 2A:
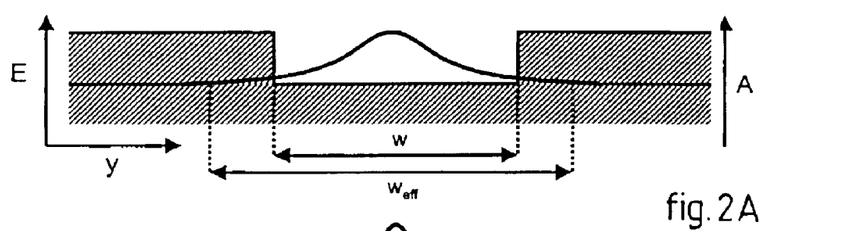
FIGS. 2A to 2C illustrate the effects of the width of a waveguide on the effective width of a mode propagating therein.
Figure 2B:
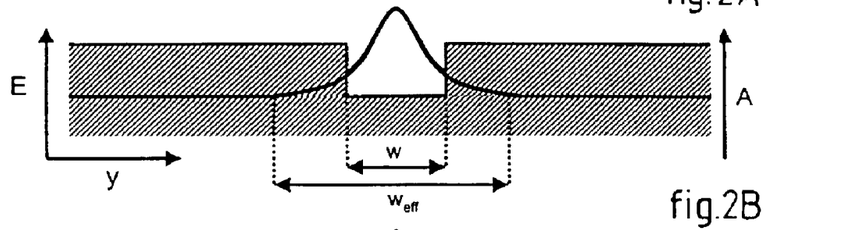
Figure 2C:
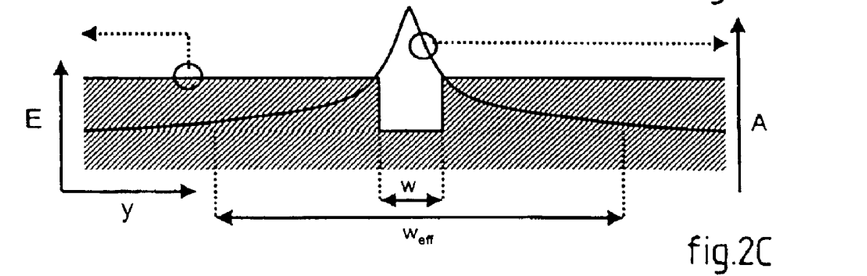

Further, FIGS. 2A to 2C illustrate a phenomenon that is advantageously employed in the preferred embodiments of the present invention. In a very wide waveguide as shown in FIG. 2A, the effective field width, $w_{eff}$, of a mode propagating in the waveguide substantially corresponds to the width, w, of the said waveguide. The effective field width decreases with a decreasing width of the waveguide as shown in FIG. 2B down to and including the critical width of the waveguide. Beyond the critical width as shown in FIG. 2C, the effective field width of the mode increases considerably which, in case of a plurality of closely spaced waveguides, results in a strong coupling of the waveguides. The field profile of the entire structure can no longer be described by the sum of the individual modal field profiles, but has to be constructed as the sum of fields of the so-called supermodes of the total waveguide structure. The left arrow head indicates that the encircled line relates to energy levels (E). The right arrow head indicates that the encircled line/curve relates to the amplitude (A) of the mode.

It is noted that, within the framework of the invention, the effective field width is defined as being equal to twice the distance from the centre of the mode to the lateral position where the amplitude of the mode has dropped to a value equal to the amplitude at the centre of the mode divided by e (≈2.7183). The above-mentioned critical width of a waveguide is dependent on the index contrast of the waveguide at the wavelength or wavelength range at which it was designed to operate and is defined as the width where the width of the mode propagating therein is at a minimum.

Figure 3:
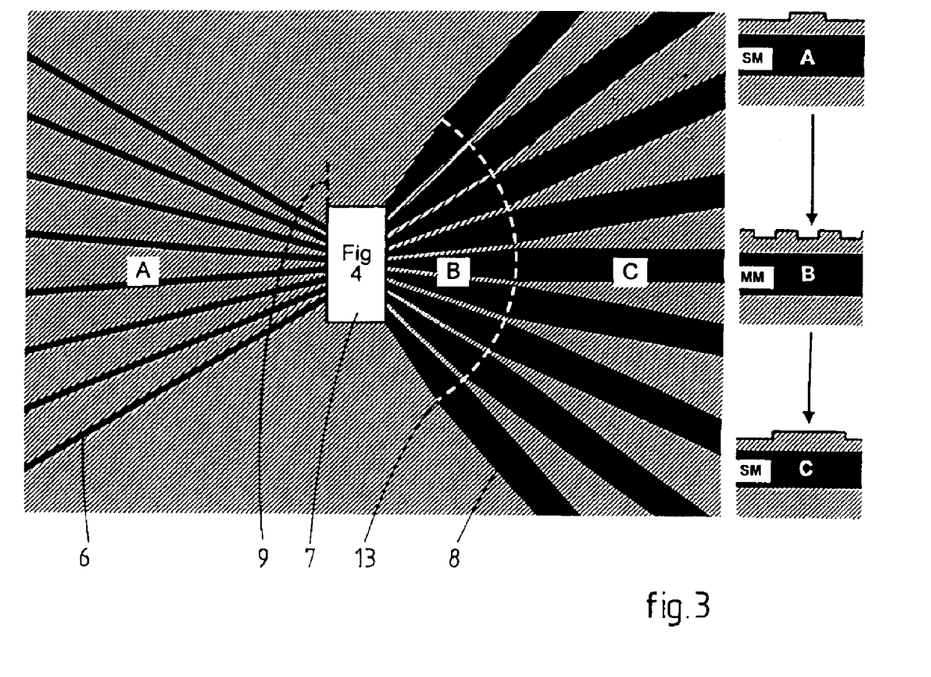
FIG. 3 shows a top view and corresponding cross-sectional view of a first preferred embodiment of the coupler according to the present invention.
Figure 4:
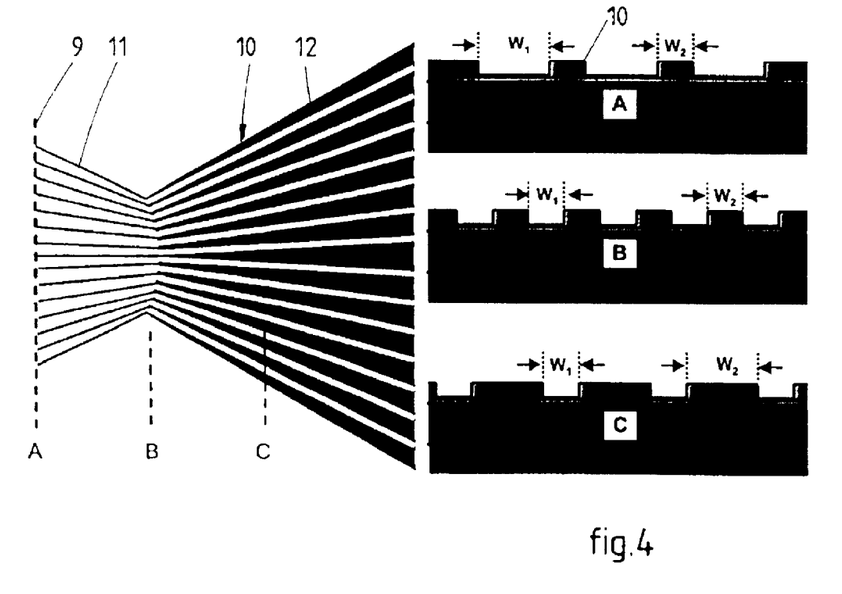
FIG. 4 shows a top view and corresponding cross-sectional views of a coupling region suitable for use in the coupler according to FIG. 3.

FIG. 3 shows that a first preferred embodiment according to the present invention further includes a plurality of single-mode (SM) or multi-mode (MM) input waveguides 6, a multi-mode (MM) coupling region 7, of which an example is shown in more detail in FIG. 4, and a plurality of single-mode or multi-mode output waveguides 8. The input waveguides 6 in a region A are de-coupled and converge towards an input plane 9 of a coupling region B.

The coupling region according to FIG. 4 further includes waveguides 10, each having a first portion 11, which converges from the input plane 9 towards a transition, or sub-region D, and a second portion 12, which diverges towards a circular output plane 13 as shown by a dotted line in FIG. 3. At this output plane 13, the second portions 12 are connected to the output waveguides 8. Further, the first portions or waveguides 11 have a width 'w2' as shown in a cross-sectional view of FIG. 4 that is less than the critical width at the wavelength at which the coupler is designed to operate, in this case 1.5 μm. At the transition B2, the width of each of the first portions 11 of the waveguides 10 is substantially equal to the width ($w_1$) in the gaps, resulting in the sum of supermodes mentioned above. The waveguides 11 are not extensions of the waveguides 6. The waveguides 11 have a different width, different pitch, and a slight different direction than the waveguides 6. In other words, the beginnings of the waveguides 11 define an input plane 9 or B1 but need not be physically connected to the waveguides 6. The only requirement is that a mode propagating in the input waveguides 6 will couple into the first portion 11. It is preferred that the region B is symmetrical.

The gaps between the second portions 12 are of constant width ($w_1$) and follow centre lines calculated by a linearised version of equations E1 mentioned above. Accordingly, the width ($w_2$) of each of the second portions 12 of the waveguides 10 increases gradually, initially to a width larger than the critical width and after that to a width equal to that of its respective output waveguide 8. As a result, the waveguides 10 are gradually de-coupled.

As the said widths $w_1$, $w_2$, need not be in excess of e.g. 1 μm, the manufacture of the coupler in hand does not require extreme lithographic resolutions and thus can be manufactured by means of a conventional and relatively straightforward lithographic process.

Figure 5A:
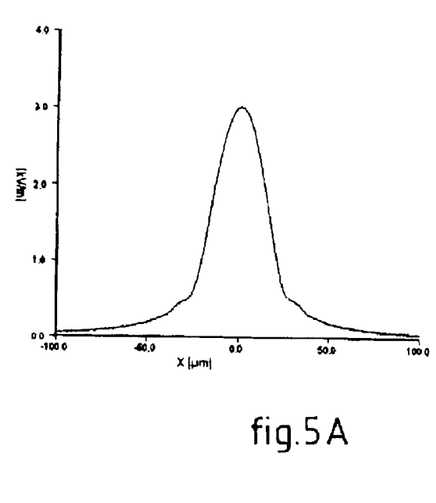
FIGS. 5A and 5B show an amplitude distribution generated by respectively a prior art coupler and a coupler according to the present invention.
Figure 5B:
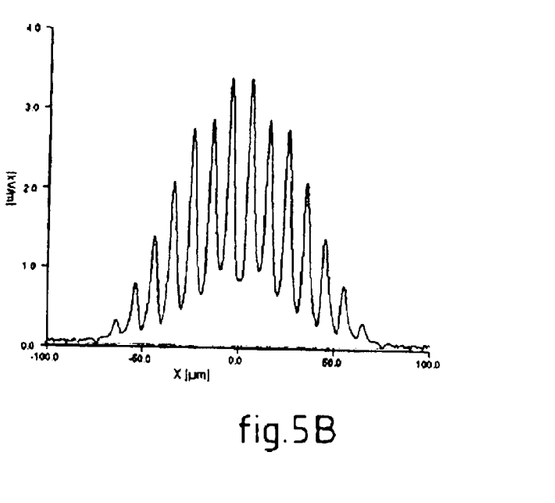

A simulation using the Beam Propagation Method (BPM) was carried out for a prior art star coupler and for the coupler according to FIGS. 3 and 4 discussed above. FIGS. 5A and 5B respectively depict a amplitude distribution of prior art and the preferred embodiment according to the current invention at the output planes of the couplers. FIG. 5A shows a smooth single distribution, whereas FIG. 5B shows a distribution having several peaks. These peaks are in register with the output waveguides 8 i.e. the amplitude is high where the coupling region is connected to the output waveguides and low at the locations of the gaps between the output waveguides 8 where losses are likely to occur.

Figure 6:
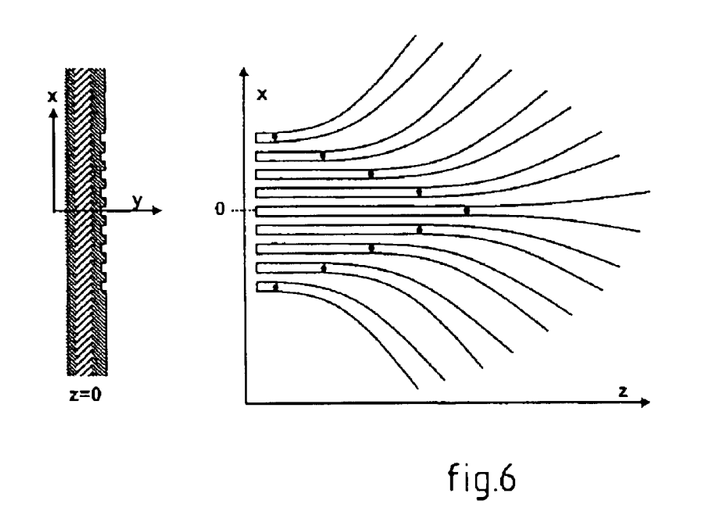
FIG. 6 shows a cross-sectional view and a top plan view of a second preferred embodiment according to the present invention.

FIG. 6 shows a part of a second preferred embodiment in the coupling region B shown in FIG. 4. Although it is not shown, the converging first portions of the waveguides in the coupling region are substantially identical to those in the coupler according to FIG. 4. However, the centre lines of the diverging second sections are calculated by means equations E2 cited above. As a result, the waveguides initially run straight over a distance, which is largest for the centre waveguide and smaller towards the edges of the coupling region. In turn, the amplitude distribution at the output plane flattens and power is distributed more evenly over the outputs.

Figure 7:
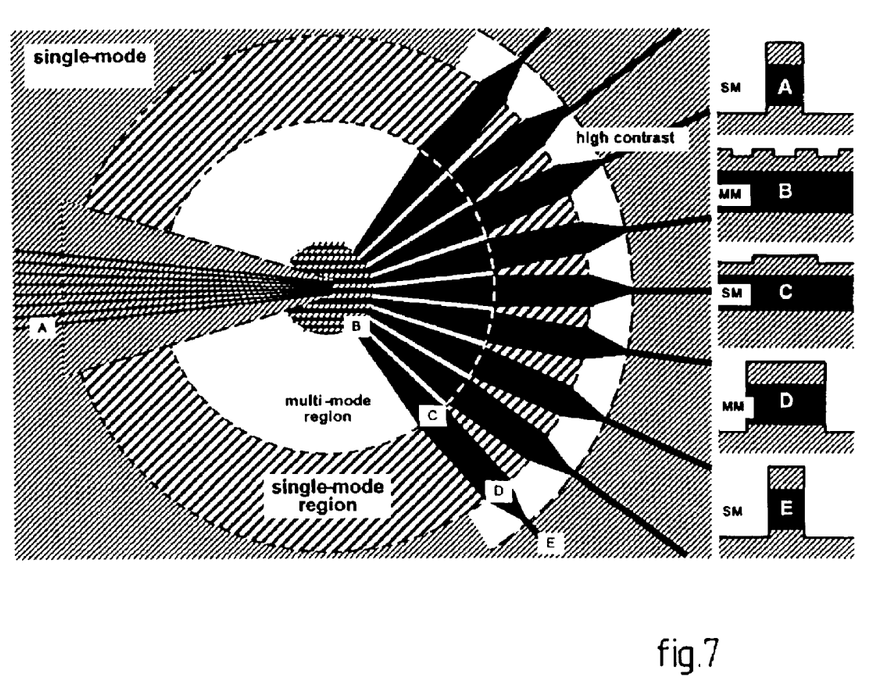
FIG. 7 shows a top plan view and corresponding cross-sectional views of a third preferred embodiment according to the present invention.

FIG. 7 shows a third preferred embodiment according to the present invention, which includes high contrast input and output waveguides. The high contrast input waveguides A are coupled directly into the coupling region B, which itself is similar to that shown in FIG. 3. For the high contrast output waveguides E, it is preferred that transitional sections are provided, which each comprise a (relatively broad) low confinement section C and a matched high confinement tapered section D which is coupled to a respective output waveguide. In this particular embodiment high contrast (in sections A, D, and E) was obtained by removing, e.g. through etching, all material on either side of the wave guides.

Figure 8A:
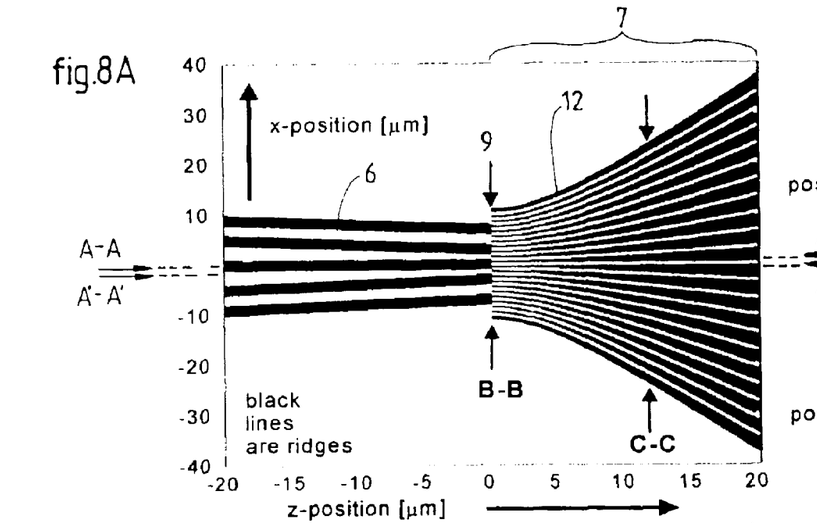
FIG. 8 shows the top plan and cross-section of the increasing gap as a function of the position in the coupling region in the Oxz plane.

FIG. 8A is a schematic diagram that illustrates a fourth preferred embodiment, which includes a plurality of single-mode (SM) or multi-mode (MM) input waveguides 6 which is optically coupled with or connected to a plurality of diverging single-mode or multi-mode waveguides 12 at an input plane (B—B). At an output plane (not shown), the diverging waveguides 12 are optically connected to output waveguides. The width w2 of each of the diverging waveguides 12 is initially less than the critical width and then gradually increases to a width that is larger than the critical width and after that to a width equal to that of its respective output waveguide to this end, the gaps between the waveguides 12 follow a pattern in accordance with equations E1.

$$x = w_i \sqrt{1 + (\alpha z)^2}; \quad \text{for } x > 0 \quad \alpha = \frac{(\lambda/n_{\mathit{eff}})}{\pi w_0};$$

-continued $$w_i = i(gap + wg); \quad i = -10 \ldots 10$$

The values used in the equation are $w_0$=1.0 μm; n=3; λ=1.545 μm; wg=0.5 μm; and gap=0.5 μm.

Figure 8B:
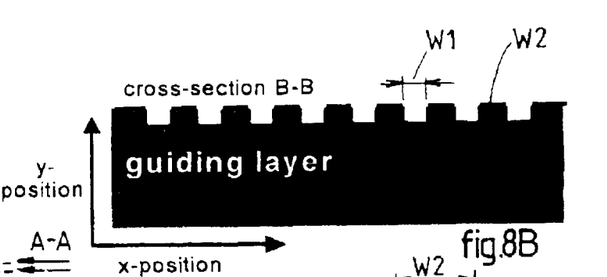
Figure 8C:
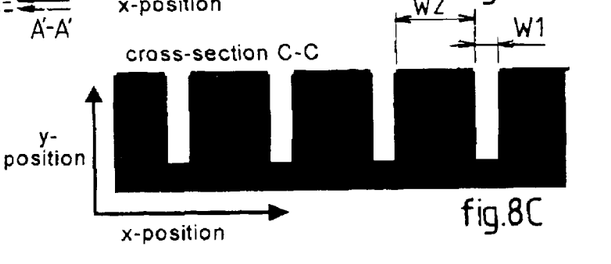

FIGS. 8B and 8C respectively show a cross sectional view of the waveguides along B—B and C—C as indicated by a corresponding pair of arrows. As shown in FIG. 8B, a cross sectional view at the interface B—B shows that an inter-waveguide gap width w1 and a waveguide width w2 are substantially equal. On the other hand, a cross sectional view at the diverging portion C—C shows that an inter-waveguide gap width w1 is smaller than a waveguide width w2.

Figure 8D:
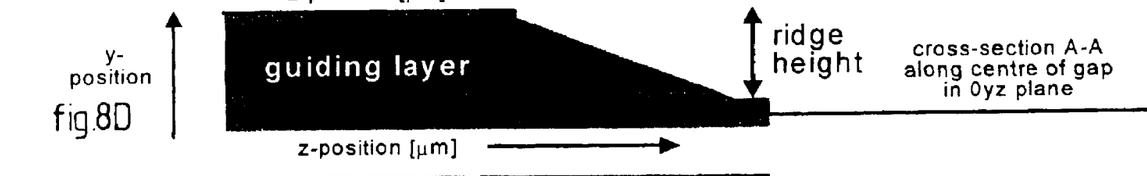
Figure 8E:
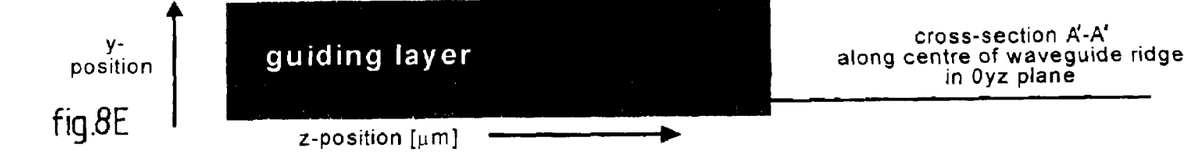

FIGS. 8D and 8E respectively show a cross sectional view of the waveguides along dotted lines A—A and A'—A' as indicated by a corresponding pair of arrows. As shown in FIG. 8D, a cross sectional view along the line A—A shows that an inter-waveguide gap gradually deepens as the waveguides 12 diverges. On the other hand, a cross sectional view along the line A'—A' shows that the waveguide surface of the waveguides 6 and 12 maintain the substantially horizontal plane.

From the above explanations, it will be clear that in the optical couplers according to the present invention both the amplitude distribution and a phase distribution, at least at the output plane, are adjusted to accurately match the output waveguides and thus to operate at relatively low loss and cross-talk.

Further, the device described in this disclosure can be considered to operate reciprocal, thereby allowing to exchange inputs and outputs and reversing both direction of the light and the operation, e.g. in direction from right.

The invention is not restricted to the above-described embodiments, which can be varied in a number of ways within the scope of the claims.

What is claimed is:

1. An optical coupler comprising:

at least one input waveguide, a coupling region optically connected to said input waveguide; and a plurality of output waveguides each optically connected to said coupling region, wherein said coupling region further comprises a plurality of coupled waveguides, which, over at least part of their lengths, diverge with respect to each other in the propagation direction of electromagnetic radiation launched in the said input waveguide, wherein at least some of the waveguides in the coupling region comprise a section having a width that is less than a predetermined critical width of the waveguide at a predetermined wavelength at which the coupler is designed to operate.

2. The optical coupler according to claim 1, wherein a width of at least some of the waveguides in the coupling region increases in the propagation direction.

3. The optical coupler according to claim 2, wherein the width of the gaps between the waveguides in the coupling region is at least substantially constant.

4. The optical coupler according to any one of claims 1, 2 and 3, wherein centre lines of at least some of the gaps between the waveguides in a coupling region follow the lines of a Gaussian field in accordance with equations E1 as follows:

$$w(z) = w_k\sqrt{1+(\alpha z)^2}\, ; \; \alpha = \frac{(\lambda/n_{\mathit{eff}})}{\pi w_o^2}; \; R = z\left(1+\left(\frac{1}{\alpha z}\right)^2\right)$$

where z is the longitudinal propagation position; w(z) is the z-dependent lateral position of the central line of the $k^{th}$ gap; $W_k$ the position of the centre of the $k^{th}$ gap at z=0; $w_0$ is the beam waist at z=0; λ is the wavelength in vacuum, $n_{\mathit{eff}}$ is the effective index and R is the radius of curvature of the phase front.

5. The optical coupler according to claim 4, wherein the equations E1 include a linearised version and polynomial approximation of the equations E1.

6. The optical coupler according to any one of claims 1, 2 and 3, wherein the centre lines of a gap between the waveguides in the coupling region follow the lines of a field in accordance with equations E2 as follows:

$$w(z) = \begin{cases} w_k, & \text{for } z < z_k \\ w_k\sqrt{1+[\alpha(z-z_k)]^2}, & \text{for } z >= z_k \end{cases}; \; \alpha = \frac{(\lambda/n_{\mathit{eff}})}{\pi w_o^2}$$

where z is the longitudinal propagation position; w(z) is the z-dependent lateral position of the central line of the $k^{th}$ gap; $W_k$ is the position of the centre of the $k_{th}$ gap at z=0; $w_0$ is the beam waist at z=0; λ is the wavelength in vacuum, and $n_{\mathit{eff}}$ is the effective index.

7. The optical coupler according to claim 6, wherein the equations E2 include a linearised version and other mathematical polynomial approximation of the equations E2.

8. The optical coupler according to any one of claims 1, 2 and 3, wherein the waveguides in the coupling region initially converge in the propagation direction and subsequently diverge.

9. The optical coupler according to any one of claim 1, 2 and 3, wherein the coupler, when electromagnetic radiation of a wavelength at which the coupler is designed to operate is launched in one of the inputs, generates (an end field with) an amplitude distribution, which exhibits, in a lateral direction, a plurality of peeks and wherein (the beginning of) the output waveguides are positioned at the lateral positions of these peaks.

10. The optical coupler according to claim 1, wherein the all the said waveguides are planar waveguides.

11. Arrayed waveguide grating comprising at least one optical coupler according to claim 1.

12. The optical coupler according to claim 1, wherein the width of the gaps between the waveguides in the coupling region is substantially constant, in combination with gradually increasing the lateral contrast between the waveguides.

13. An optical coupler comprising:
at least one input waveguide, a coupling region optically connected to said input waveguide; and
a plurality of output waveguides each optically connected to said coupling region, wherein said coupling region further comprises a plurality of coupled waveguides, at least some section of said coupled waveguides having a width that is less than a predetermined critical width at a predetermined wavelength at which said optical coupler is designed to operate, said coupled waveguides over at least another part of their lengths diverging with respect to each other in the propagation direction of electromagnetic radiation launched in the said input waveguide.

14. The optical coupler according to claim 13, wherein centre lines of at least some of the gaps between the waveguides in a coupling region follow the lines of a Gaussian field in accordance with equations E1 as follows:

$$w(z) = w_k\sqrt{1+(\alpha z)^2}\, ; \; \alpha = \frac{(\lambda/n_{\mathit{eff}})}{\pi w_o^2}; \; R = z\left(1+\left(\frac{1}{\alpha z}\right)^2\right)$$

where z is the longitudinal propagation position; w(z) is the z-dependent lateral position of the central line of the $k^{th}$ gap; $w_k$ is the position of the centre of the $k^k$ gap at z=0; $w_0$ is the beam waist at z=0; λ is the wavelength in vacuum, $n_{\mathit{eff}}$ is the effective index and R is the radius of curvature of the phase front.

15. The optical coupler according to claim 14, wherein the equations E1 include a linearised version and polynomial approximation of the equations E1.

16. The optical coupler according to claim 13, wherein the centre lines of a gap between the waveguides in the coupling region follow the lines of a field in accordance with equations E2 as follows:

$$w(z) = \begin{cases} w_k, & \text{for } z < z_k \\ w_k\sqrt{1+[\alpha(z-z_k)]^2}, & \text{for } z >= z_k \end{cases}; \; \alpha = \frac{(\lambda/n_{\mathit{eff}})}{\pi w_o^2}$$

where z is the longitudinal propagation position; w(z) is the z-dependent lateral position of the central line of the $k^{th}$ gap; $w_k$ is the position of the centre of the $k^{th}$ gap at z=0; $w_0$ is the beam waist at z=0; λ is the wavelength in vacuum, and $n_{\mathit{eff}}$ is the effective index.

17. The optical coupler according to claim 16, wherein the equations E2 include a linearised version and polynomial approximation of the equations E2.

18. An optical coupler comprising:
at least one input waveguide, a coupling region optically connected to said input waveguide; and
a plurality of output waveguides each optically connected to said coupling region, wherein said coupling region further comprises a plurality of coupled waveguides, at least some section of said coupled waveguides having a width that is less than a predetermined critical width at a predetermined wavelength at which said optical coupler is designed to operate.

19. The optical coupler according to claim 18, wherein said coupled waveguides over at least another part of their lengths diverging with respect to each other in the propagation direction of electromagnetic radiation launched in the said input waveguide.

20. The optical coupler according to claim 19, wherein centre lines of at least some of the gaps between the waveguides in a coupling region follow the lines of a Gaussian field in accordance with equations E1 as follows:

$$w(z) = w_k\sqrt{1+(\alpha z)^2}\, ; \; \alpha = \frac{(\lambda/n_{\mathit{eff}})}{\pi w_o^2}; \; R = z\left(1+\left(\frac{1}{\alpha z}\right)^2\right)$$

where z is the longitudinal propagation position; w(z) is the Z-dependent lateral position of the central line of the $k^{th}$ gap; $w_k$ is the position of the centre of the $k^{th}$ gap at z=0; $w_0$ is the beam waist at z=0; λ is the wavelength in vacuum, $n_{\mathit{eff}}$ is the effective index; and R is the radius of curvature of the phase front.

21. The optical coupler according to claim 20, wherein the equations E1 include a linearised version and polynomial approximation of the equations E1.

22. The optical coupler according to claim 19, wherein the centre lines of a gap between the waveguides in the coupling region follow the lines of a field in accordance with equations E2 as follows:

$$w(z) = \begin{cases} w_k, & \text{for } z < z_k \\ w_k\sqrt{1+[\alpha(z-z_k)]^2}, & \text{for } z >= z_k \end{cases} ; \alpha = \frac{(\lambda/n_{eff})}{\pi w_o^2}$$

where z is the longitudinal propagation position; w(z) is the z-dependent lateral position of the central line of the $k^{th}$ gap; $w_k$ is the position of the centre of the $k^{th}$ gap at z=0; $w_0$ is the beam waist at z=0; λ is the wavelength in vacuum, and $n_{eff}$ is the effective index.

23. The optical coupler according to claim 22, wherein the equations E2 include a linearised version and polynomial approximation of the equations E2.

* * * * *